United States Patent
Gross et al.

(10) Patent No.: US 6,350,095 B1
(45) Date of Patent: Feb. 26, 2002

(54) SUSTAINER FOR A VEHICLE ROOF RAIL

(75) Inventors: Michael Gross, Bochum; Thomas Stertkamp, Wuppertal, both of (DE)

(73) Assignee: JAC Products Deutschland GmbH, Wuppertal (DE)

( * ) Notice: Subject to any disclaimer, the term of this patent is extended or adjusted under 35 U.S.C. 154(b) by 0 days.

(21) Appl. No.: 09/654,129

(22) Filed: Sep. 1, 2000

(30) Foreign Application Priority Data

Sep. 22, 1999 (DE) .......................................... 199 45 295

(51) Int. Cl.$^7$ ............................ F16B 21/00; F16B 39/22
(52) U.S. Cl. ..................... 411/298; 411/107; 411/348; 411/389
(58) Field of Search ................................ 411/107, 294, 411/298, 299, 348, 389

(56) References Cited

U.S. PATENT DOCUMENTS

| | | |
|---|---|---|
| 3,451,602 A | 6/1969 | Bott |
| 4,174,794 A | 11/1979 | Bott |
| 4,448,336 A | 5/1984 | Bott |
| 4,673,119 A | 6/1987 | Bott |
| 4,681,495 A * | 7/1987 | Crespin et al. ............. 411/298 |
| 4,850,774 A * | 7/1989 | Weaver et al. ............. 411/298 |
| 4,944,439 A | 7/1990 | Bott |
| 5,284,408 A * | 2/1994 | Duran et al. ............ 411/348 X |

FOREIGN PATENT DOCUMENTS

| | | |
|---|---|---|
| DE | 31 23 106 A1 | 12/1982 |
| DE | 40 04 829 A1 | 8/1991 |
| DE | 42 23 898 A1 | 1/1994 |
| DE | 44 18 528 C1 | 6/1995 |
| DE | 197 13 722 A1 | 8/1998 |
| DE | 197 13 781 A1 | 8/1998 |
| EP | 0 580 023 A1 | 4/1994 |

OTHER PUBLICATIONS

U.S. Ser. No. 09/501,945, filed Feb. 10, 2000, presently pending.

* cited by examiner

*Primary Examiner*—Neill Wilson
(74) *Attorney, Agent, or Firm*—Harness, Dickey & Pierce, PLC

(57) ABSTRACT

A sustainer for securing a roof rail to a vehicle surface, which does not require protrusions or bumps to be formed on the vehicle surface to prevent unwanted rotation of the sustainer during tightening of an external bolt onto the sustainer.

10 Claims, 3 Drawing Sheets

SUSTAINER FOR A VEHICLE ROOF RAIL

TECHNICAL FIELD

The invention relates to a sustainer for a vehicle roof rail, and more particularly to a sustainer that is self-adjusting and does not require protrusions or bumps to be formed in the roof surface of a vehicle to assist in holding the sustainer stationary during assembly to the vehicle roof.

BACKGROUND OF THE INVENTION

A generic sustainer is shown in EP0780267A1. This known sustainer features a fastening bolt with a first threaded portion and a second threaded portion running in the opposite direction to the first. A support part, which separates the threaded portions from each other, is located between the threaded portions.

During assembly, the support part comes to rest on a support sheet upon which rib-shaped bumps have been molded. The bumps are supposed to prevent the fastening bolt from rotating further than desired while a nut is being screwed on.

A disadvantage of this known sustainer is the unavoidably necessary manipulation on the vehicle's roof (i.e., on the roof panel or on the floor of a roof channel) for the purpose of molding rib-shaped bumps. It has been shown in practice that automobile manufacturers strongly resist forming such bumps or protrusions during manufacture of the vehicle.

SUMMARY OF THE INVENTION

It is the objective of the present invention to provide automatic compensation for tolerances between a sustainer and a roof, or a roof channel, without the need for additional steps of forming rib-shaped bumps on the roof to assist in securing the sustainer to the roof.

The sustainer of the present invention comprises a fastening bolt assembly having a fastening bolt. The fastening bolt has a head portion and a shank. The head portion includes a first threaded portion and the shank portion includes a second threaded portion. The second threaded portion is formed with its threads opposite to the first threaded portion. The head portion also includes a through bore within which is disposed a spring positioned inbetween opposing blocking elements. A pair of channels are also formed in the head portion which each receive moveable pins. The head portion is screwed into a journal piece of a roof rail prior to fastening of the roof rail to the vehicle roof.

During assembly, when a nut is tightened onto the shank of the fastening bolt, this causes the head portion to be unscrewed from the journal piece. As this occurs, the pins move into positions whereby the blocking elements are able to extend through openings formed in each of the pins, and into integrally formed structure on the journal piece. This prevents further rotation of the fastening bolt as the nut is tightened further onto the shank.

The present invention accomplishes self-adjustment of the sustainer and prevents unwanted rotation of the fastening bolt relative to the journal without requiring special surface projections to be formed on the vehicle roof.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
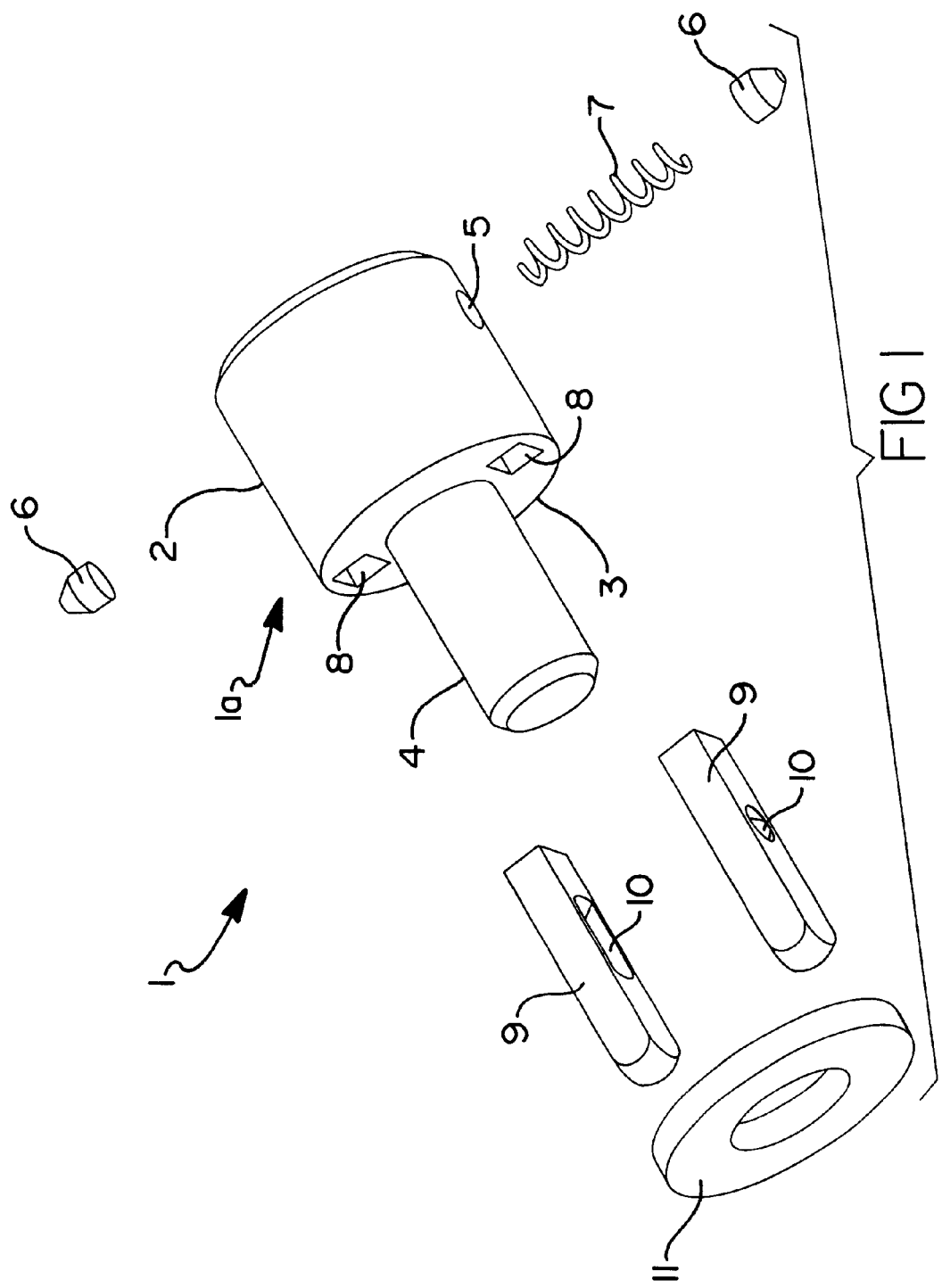
FIG. 1 is an exploded perspective view of the fastening bolt assembly forming a sustainer in accordance with a preferred embodiment of the present invention.

FIG. 1 shows a fastening bolt assembly 1 in accordance with a preferred embodiment of the present invention, which is designed as a tolerance compensator for a sustainer of a roof rail (not shown). The fastening bolt assembly 1 contains a bolt 1a having a cylindrical bolt head 2 and a cylindrical bolt shank 4. The shank 4 is offset from the bolt head 2 by a step 3, whose diameter is substantially smaller than that of the bolt head 2. Bolt head 2 features a left-handed thread and bolt shank 4 a right-handed thread.

Bolt head 2 features a cross hole or bore 5, which is designed as a through-hole, and which is used to accommodate two blocking elements 6 and a spring 7 installed between them. The spring is preferably a compression spring. The bolt head 2 also features two channels or bores 8 passing axially therethrough which each intersect the cross bore 5. The bores 8 each are used to accommodate one pin 9 in each.

The bores 8 can be designed closed, as illustrated, or also could be formed as channels that open on the rim and be undercut at the same time, if necessary. Each bore 8 features a cross-sectional opening that is matched to the cross sectional shape of the pins 9, such as square, rectangular, or even rounded shapes. The pins 9 are detachably fastened within the bores 8, preferably by an adhesive bond. The pins 9 each feature an opening 10 that is shaped strongly conical. A washer 11, which can be milled from a steel part or cast out of various materials, is also preferably part of the fastening bolt assembly 1.

Figure 2:
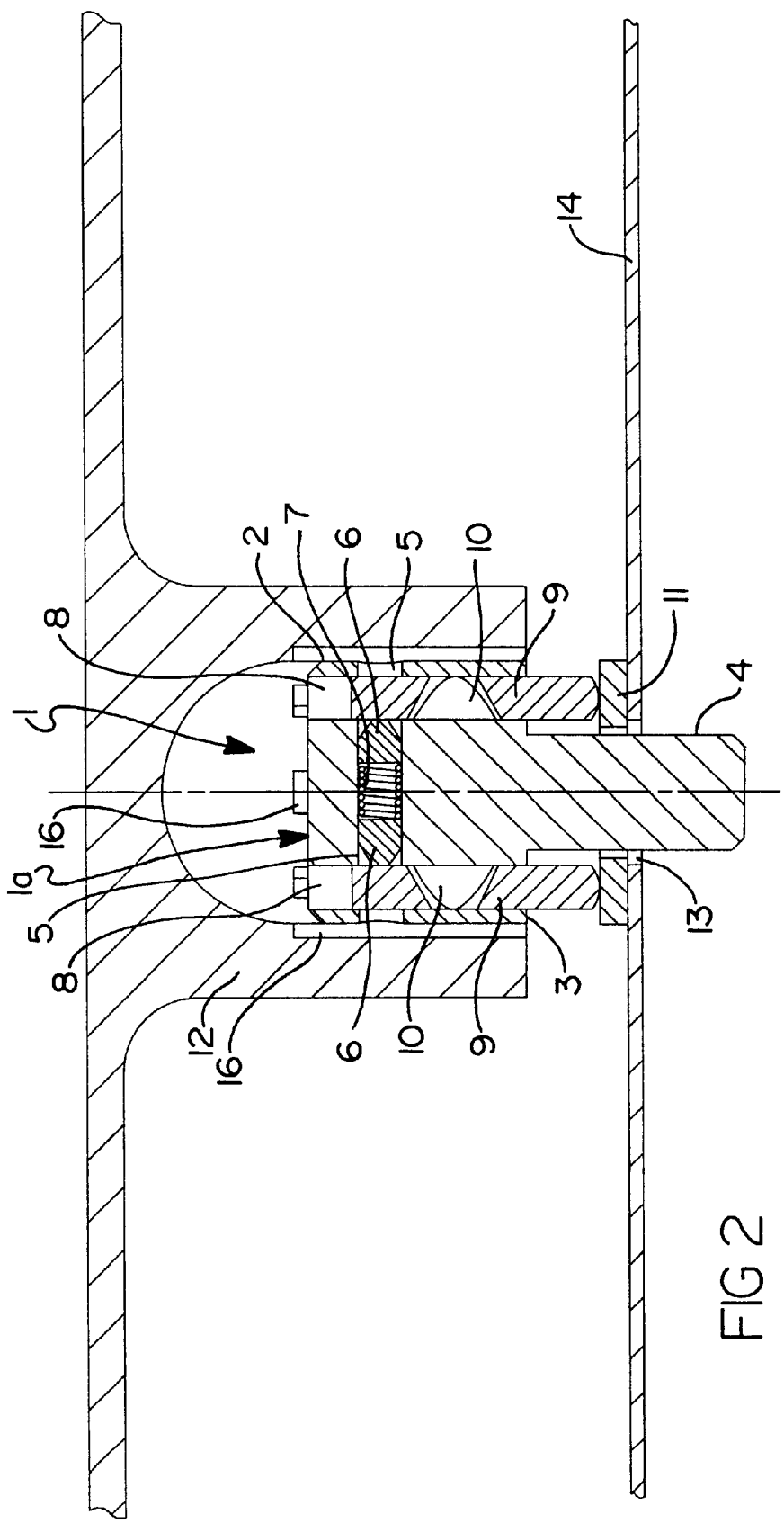
FIG. 2 is a side cross-section view of the fastening bolt assembly of FIG. 1 placed in position ready to secure a journal piece of a roof rail to the roof of the vehicle.

Referring to FIG. 2, when a roof rail is delivered, each sustainer, respectively, is equipped with a fastening bolt assembly 1 which serves as a tolerance compensator at the same time. In this regard, the bolt head 2 is located within a tapped hole of a journal piece 12 of the roof rail. Bolt head 2 is screwed sufficiently far into the tapped hole so that the step 3 and the open end of journal piece 12 are at approximately the same height. The pins 9, which are detachably fastened within the channels 8 preferably via adhesives, are located in a position in which they protrude over the open end of the journal piece 12 on the one hand and on the other hand prevent the blocking elements 6 from coming out of the cross bore 5.

Figure 3:
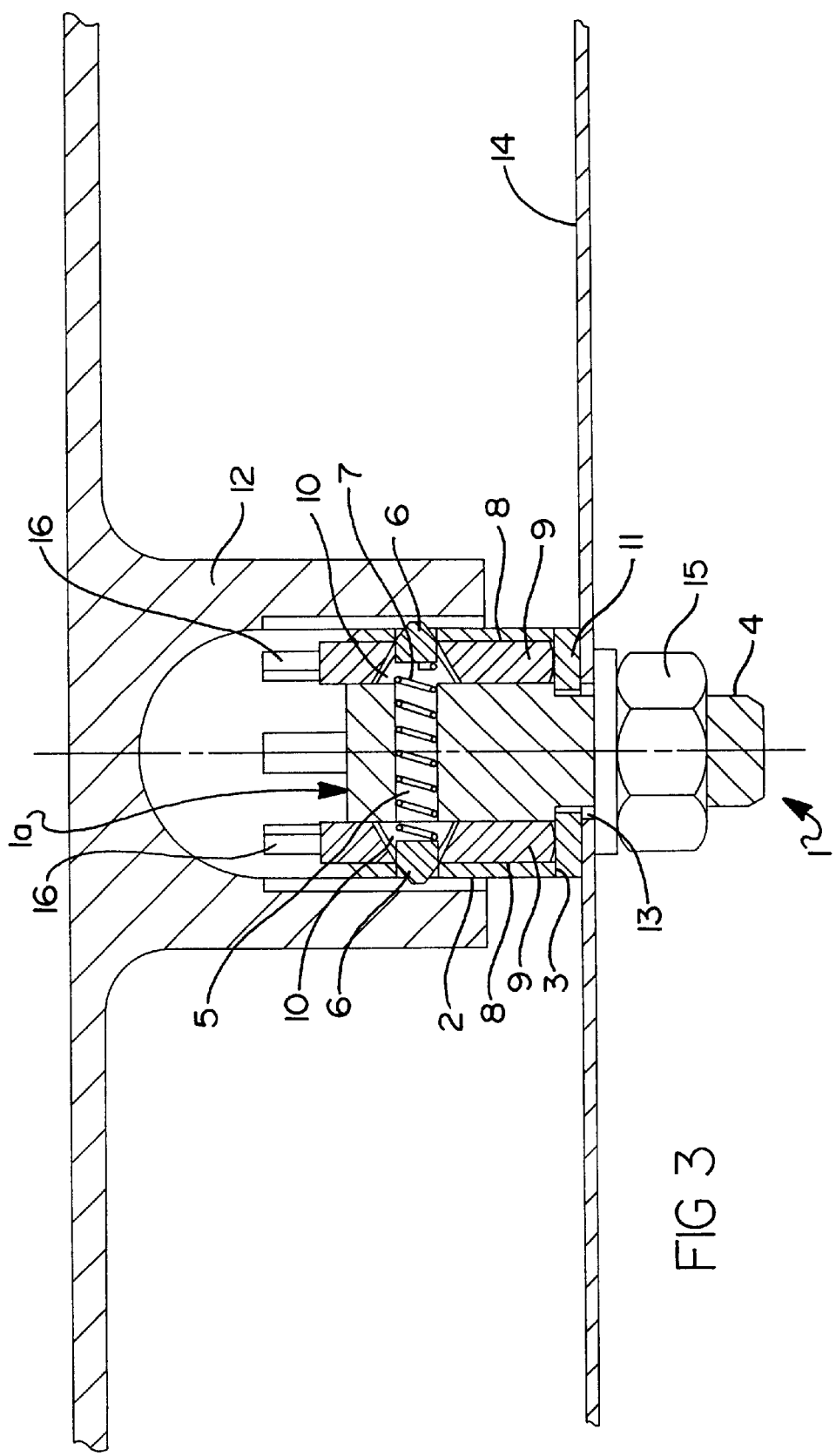
FIG. 3 illustrates the fastening bolt assembly in a fully secured position relative to the vehicle roof.

The actual fastening process can be executed according to the fitting arrangement shown in FIGS. 2 and 3, wherein a fixing nut 15 (FIG. 3) is screwed onto bolt shank 4. When the fixing nut 15 is being screwed on, the bolt head 2 is forced to unscrew itself downwards out of the left-handed thread of the journal piece 12 because of the small degree of friction between it and the thread of the journal piece. During this process, the fastening of pins 9 becomes detached because the relatively weak adhesive bond tears. By additional rotation of the fixing nut 15 in the tightening direction, bolt head 2 continues to be unscrewed out of journal piece 12 until the step 3 abuts the washer 11. In this position of assembly, the blocking elements 6, which each feature a conical tip, are pressed through the openings 10 of the pins 9 and out of the cross bore 5, as a consequence of the prestressing force of the spring 7 acting upon them. The blocking elements 6 are urged against the wall of the tapped hole of journal piece 12. Since this wall features several longitudinal slots 16 distributed over the perimeter, the fastening bolt 1a will only continue to rotate until the blocking elements 6 each engage one of the longitudinal slots 16 and lock the bolt head 2 into position with the journal piece 12. At this point, the screw connection can then be tightened fully and the roof 14 can be braced between the step 3, the washer 11, and the fixing nut 15.

FIG. 2 shows the delivery state as well as the start of assembly. The bolt shank 4 passes through the washer 11 and an opening 13 in the vehicle's roof 14. he washer 11 rests on the roof 14 and supports the open end of the pins 9. The term "roof" should also be understood to encompass the floor of a roof channel designed within a vehicle roof.

The actual fastening process can be executed according to the fitting arrangement shown in FIGS. 2 and 3, wherein a fixing nut 15 (FIG. 3) is screwed onto bolt shank 4. When the fixing nut 15 is being screwed on, the bolt head 2 is forced to unscrew itself downwards out of the left-handed thread of the journal piece 12. During this process, the fastening of pins 9 becomes detached because the relatively weak adhesive bond tears. By additional rotation of the fixing nut 15 in the tightening direction, bolt head 2 continues to be unscrewed out of journal piece 12 until the step 3 abuts the washer 11. In this position of assembly, the blocking elements 6, which each feature a conical tip, are pressed through the openings 10 of the pins 9 and out of the cross bore 5, as a consequence of the prestressing force of the spring 7 acting upon them. The blocking elements 6 are urged against the wall of the tapped hole of journal piece 12. Since this wall features several longitudinal slots 16 distributed over the perimeter, the fastening bolt 1a will only continue to rotate until the blocking elements 6 each engage one of the longitudinal slots 16 and lock the bolt head 2 into position with the journal piece 12. At this point, the screw connection can then be tightened fully and the roof 14 can be braced between the step 3, the washer 11, and the fixing nut 15.

The position of the openings 10 in the pins 9 define the path that can still be reached after everything is locked into position, and that can be used for pressing a conventional base, not depicted here, that is installed between the sustainer and the roof 14. The gap arising between the sustainer and the roof panel can largely be kept constant by the described measures. In particular, the described system is assembly-friendly and insensitive to its own and external tolerances.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A self-adjusting sustainer for securing a roof rail to a vehicle roof without the need for forming projections on the vehicle roof to prevent unwanted rotation of the sustainer during assembly of the roof rail to the vehicle roof, the sustainer comprising:

a bolt assembly including:
a bolt having a head portion and a shank, the head portion having a first threaded portion and being threadably securable to a portion of said roof rail, the shank having a second threaded portion opposite to said first threaded portion and being threadably securable to an external fastening element;
the bolt having a first bore, at least one blocking element disposed within said first bore, and a biasing member disposed within said first bore for exerting a biasing force on said blocking element extending to urge said biasing element out of said first bore and opening into communication with said first bore;
at least one second bore formed in said head portion;
a pin having an opening and being disposed at least partially in said second bore; and
wherein as said external nut is tightened onto said shank, said head portion is displaced relative to said portion of said roof rail because of a degree of friction between said external nut and said second threaded portion, thus causing said pin to be urged into contact with a planar surface external of said second bore and to move within said second bore such that its said opening comes into alignment with said blocking element, and wherein said blocking element is urged through said opening and engages structure associated with said portion of said roof rail, thus preventing further rotational movement of said bolt and enabling said portion of said roof rail to be secured relative to said vehicle roof.

2. The sustainer of claim 1, wherein said bolt comprises a pair of said second bores.

3. The sustainer of claim 1, wherein a pair of blocking elements are disposed within said first bore on opposing sides of said biasing member, wherein a pair of said pins are disposed in a corresponding pair of second bores, and wherein said pair of blocking elements protrude though said openings in each of said pins to engage with a pair of spaced apart structures of said portion of said roof rail to hold said bolt against further displacement.

4. The sustainer of claim 1, wherein said pin is initially secured with an adhesive within said second bore to prevent accidental removal therefrom prior to securing of said roof rail to said vehicle roof.

5. A self-adjusting sustainer for securing a roof rail to a vehicle outer body surface without the need for forming projections on the outer body surface to prevent unwanted rotation of the sustainer during assembly of the roof rail to the outer body surface, the sustainer comprising:

a bolt assembly including:
a bolt having a head portion and a shank, the head portion having a first threaded portion and being threadably securable to a journal portion of said roof rail, the shank having a second threaded portion opposite in orientation to said first threaded portion and being threadably securable to an external fastening element;
the bolt having a first bore, at least one blocking element disposed within said first bore, and a biasing member disposed within said first bore for exerting a biasing force on said blocking element;
at least one second bore formed in said head portion and intersecting said first bore;
a pin having an opening and being disposed at least partially in said second bore; and
wherein as said external fastening element is tightened onto said second threaded portion of said shank, said head portion is unthreaded relative to said journal portion, because of friction between said external fastening element and said second threaded portion of said shank, causing said pin to abut an external surface member, and to be urged further into said second bore such that its said opening comes into alignment with said blocking element, and wherein said blocking element is thereupon urged by said biasing member to protrude through said opening and engage structure associated with said journal portion, thus preventing further movement of said bolt and enabling said journal to be secured relative to said outer body surface.

6. The sustainer of claim 5, wherein said external surface member comprises a washer disposed on said vehicle outer body surface over said shank, against which said pin abuts, to thereby cause displacement of said pin as said external fastening element is tightened onto said shaft.

7. The sustainer of claim 5, wherein a step is formed intermediate said head portion and said shank of said bolt, said step limiting displacement of said bolt relative to said journal portion as said external fastening element is fastened onto said shank.

8. The sustainer of claim 5, wherein a pair of second bores are formed in said head portion, each said bore receiving an associated said pin therein.

9. The sustainer of claim 5, wherein a pair of said blocking elements are disposed on opposite sides of said member within said first bore.

10. A self-adjusting sustainer for securing a roof rail to a vehicle outer body surface without the need for forming projections on the outer body surface to prevent unwanted rotation of the sustainer during assembly of the roof rail to the outer body surface, the sustainer comprising:

a bolt assembly including:

a bolt having a head portion and a shank, said head portion and said shank having oppositely formed threaded portions;

a first bore formed in said head portion and having a blocking element disposed therein;

a second bore formed in said head portion and having a pin disposed therein, said pin being held within said second bore by a securing component and further having an opening formed so as to register with said first bore when said head portion is unthreaded to a predetermined position from a threaded opening in said sustainer; and wherein tightening of an external threaded fastener onto said shank causes a sufficient degree of rotational movement of said head portion, as a result of friction between said shank and said fastener, to thereby cause said pin to be brought into abutting contact with a surface external to said bolt, thus causing said pin to be released from said securing component and moved linearly such that said opening in said pin registers with said blocking element to enable said blocking element to engage said threaded opening in said sustainer, thus preventing further rotational movement of said bolt while said fastener is tightened onto said shank.

\* \* \* \* \*